Dec. 23, 1947. W. J. SPARKS ET AL 2,433,070
METHOD FOR PRODUCING SYNTHETIC RUBBERLIKE POLYMERS
Filed Jan. 1, 1943 5 Sheets-Sheet 1
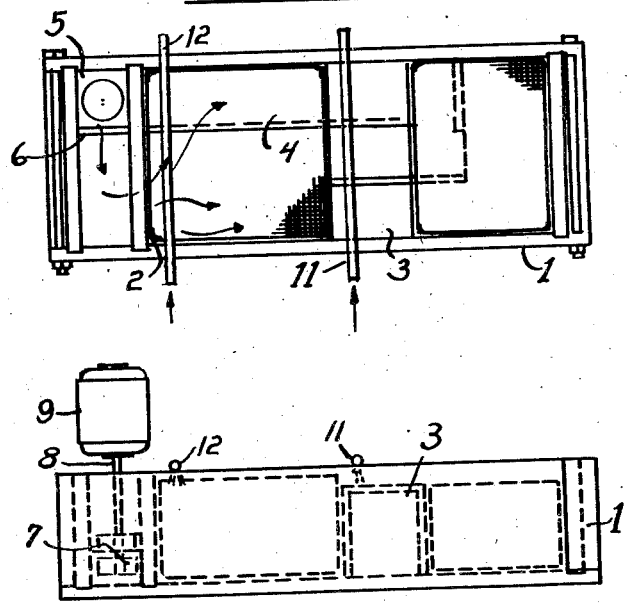
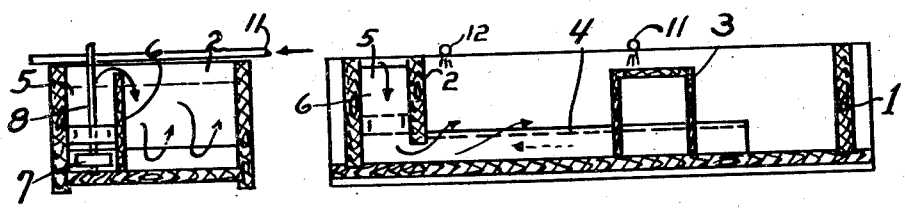

Dec. 23, 1947.  W. J. SPARKS ET AL  2,433,070
METHOD FOR PRODUCING SYNTHETIC RUBBERLIKE POLYMERS
Filed Jan. 1, 1943     5 Sheets-Sheet 2
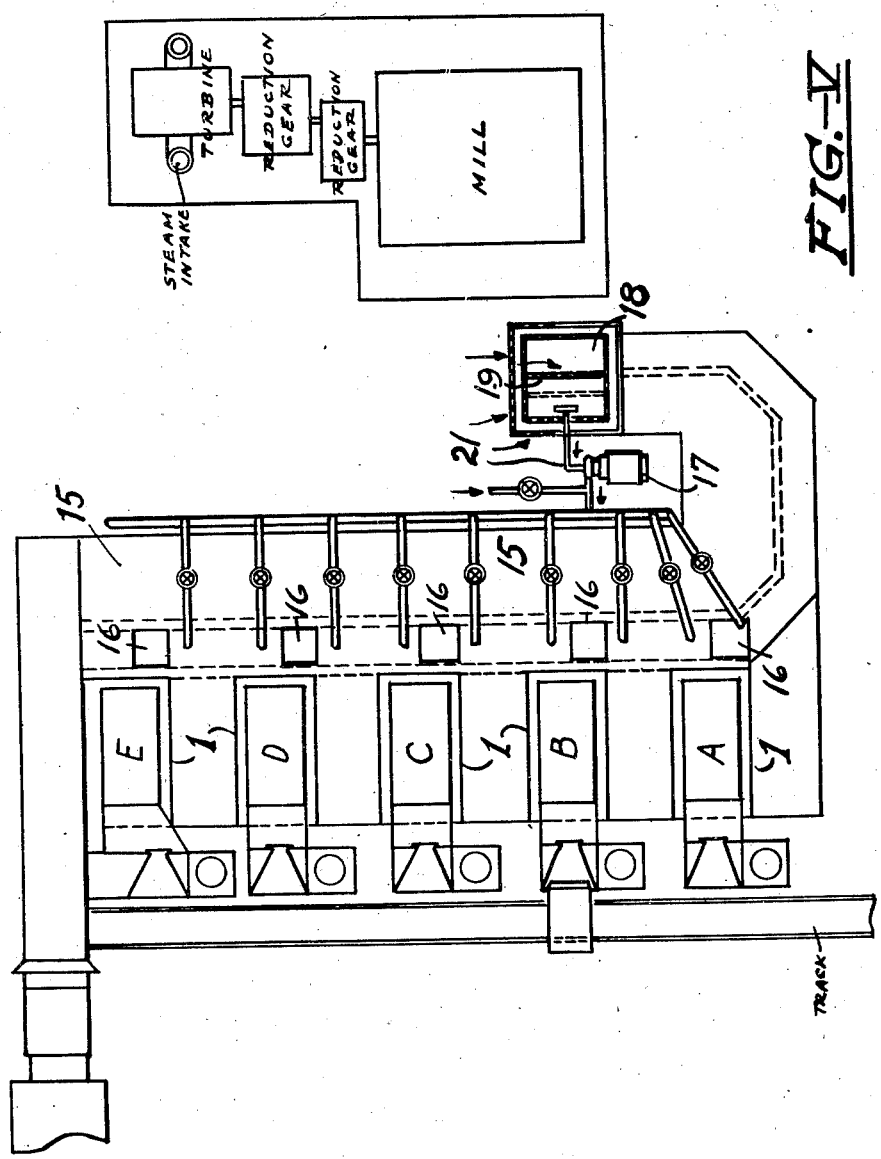
FIG.-V
William J. Sparks Inventors
John D. Calfee
By P. L. Young Attorney

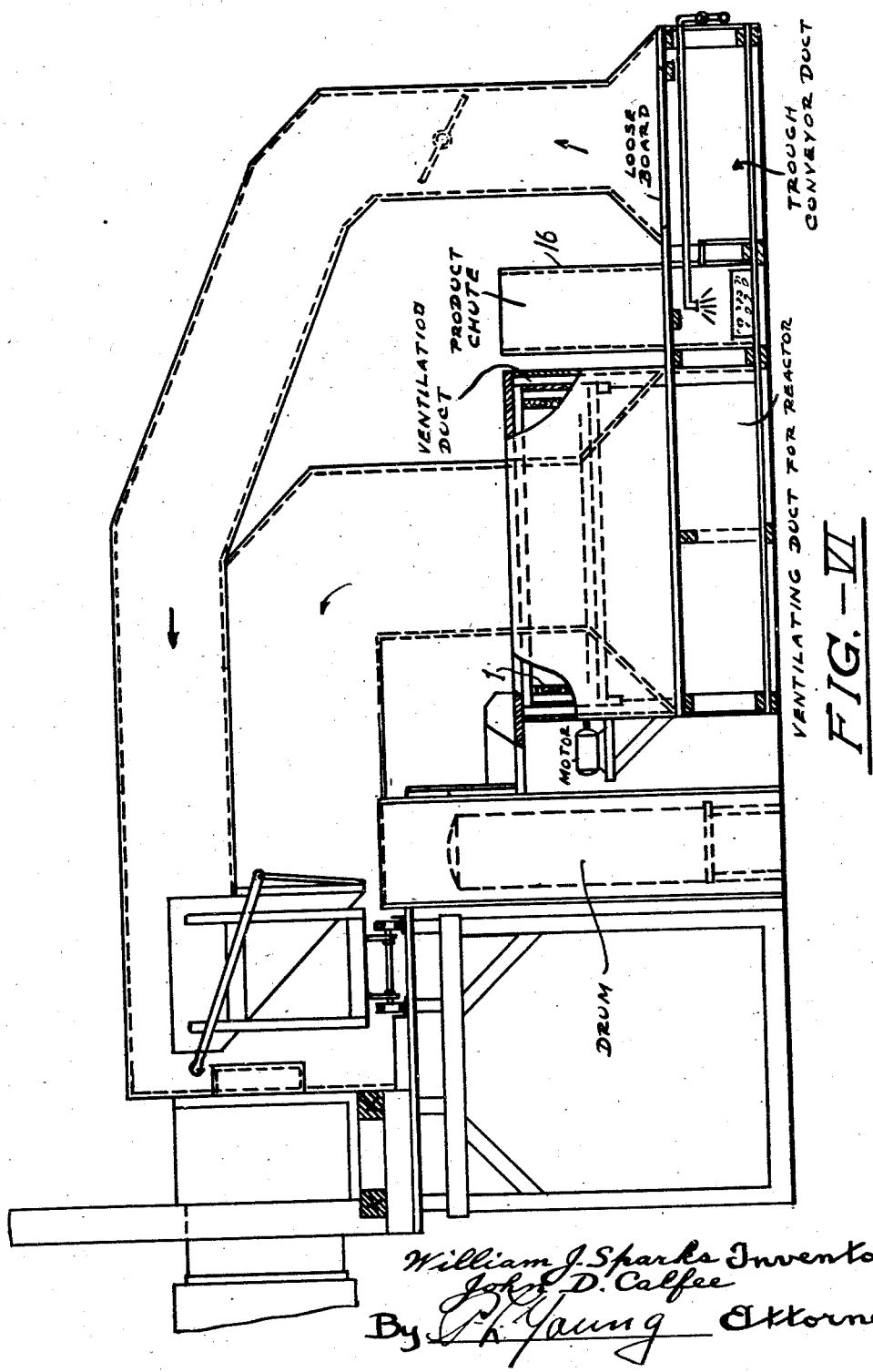

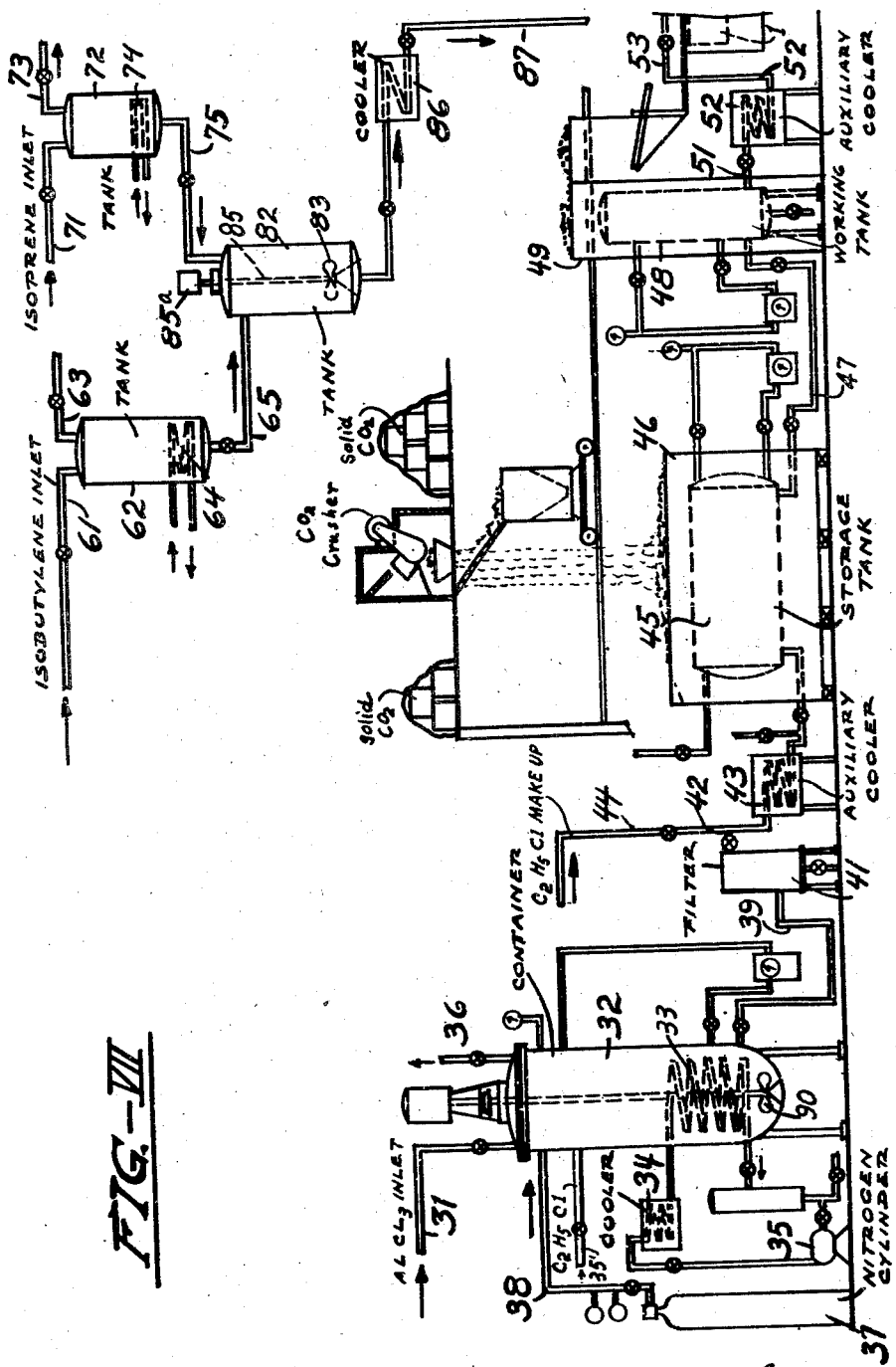

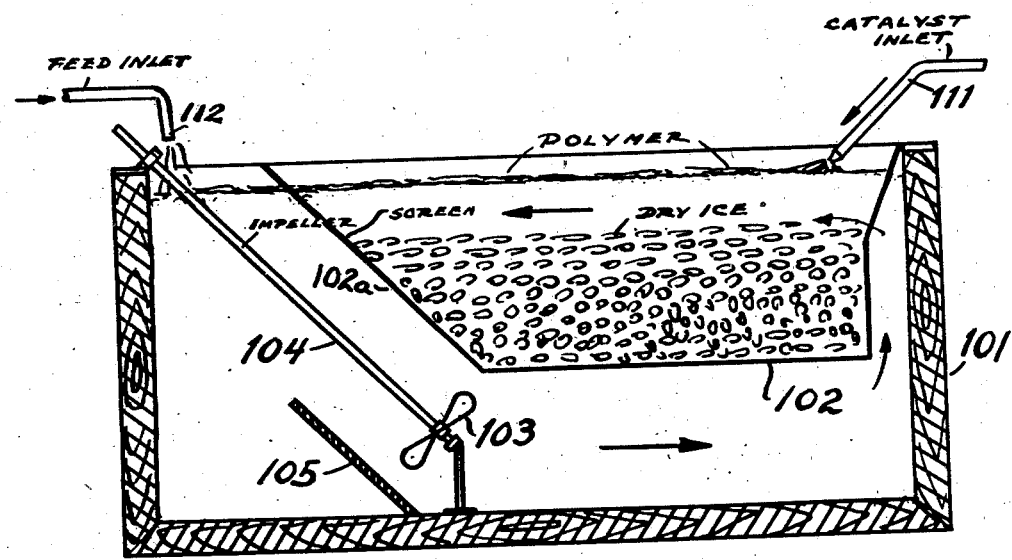
FIG.-VIII

Patented Dec. 23, 1947

2,433,070

UNITED STATES PATENT OFFICE 2,433,070

METHOD FOR PRODUCING SYNTHETIC RUBBERLIKE POLYMERS

William J. Sparks and John D. Calfee, Cranford, N. J., assignors to Standard Oil Development Company, a corporation of Delaware Application January 1, 1943, Serial No. 470,958

2 Claims. (Cl. 260—93)

This application relates to polymerization processes, relates particularly to simplified methods for the low temperature polymerization of olefins, and relates especially to a process for the polymerization of olefinic material in simple equipment under conditions which cause the produced solid polymer to float upon the surface of the polymerization mixture at a point available for easy removal by a workman.

It has been found possible to prepare a considerable number of commercially very valuable olefinic polymers from isobutylene and mixtures of isobutylene with a wide range of polyolefins, particularly butadiene and the lower substituted butadienes up to about 12 carbon atoms per molecule, by a process utilizing a Friedel-Crafts type catalyst such as aluminum chloride dissolved in a low freezing, non-complex forming solvent, such as a lower alkyl halide having less than about 5 carbon atoms, or carbon disulfide or the like. This reaction on a commercial scale has previously been conducted by the use of liquid ethylene as a refrigerant mixed with the olefins, the reaction being conducted in a closed reactor provided with a refrigerant jacket filled with liquid ethylene, elaborate precautions being taken to recover volatilized components for purification and reuse, since all are rather expensive materials. This process involves a great deal of machinery, much of which must be made of special steels to withstand the low temperatures involved and the apparatus is expensive to build and install and complicated to operate.

The present invention utilizes a mixture of polymerizable olefinic material with a volatile refrigerant, under such circumstances that the heat of polymerization of the olefinic material volatilizes a sufficient amount of the volatile refrigerant in such intimate contact with the solid polymer that the gas is occluded in the solid polymer in sufficient quantity to reduce its density substantially below the density of the cold polymerization mixture, thereby causing the solid polymer to float upon the surface in a location in which it is conveniently available for removal by a strainer in the hands of an attending workman.

This process of the invention may conveniently be practised in a simple wooden tank having circulating means for keeping the contents in motion and a shallow portion over which a rapid flow of olefinic mixture occurs, onto which the catalyst may be applied. The application of the catalyst causes a prompt polymerization reaction, and the application at such a point permits of the occlusion of volatilized refrigerant in the solid polymer which causes it to float upon the surface of the body of cold olefinic mixture in the tank. This surface may, without harm, be exposed to the atmosphere, since, when solid carbon dioxide is used, the vapor pressure of the olefinic material is so low that very little loss occurs and practically the only volatilizate is carbon dioxide which is non-poisonous and non-combustible. The floating solid polymer with its occluded gaseous refrigerant is then conveniently skimmed off from the surface and further processed.

The apparatus may further utilize a rapid circulation of water into which the polymer skimmed from the surface of the reactant material is thrown for purification, transportation, and further treatment.

The process of the invention preferably utilizes a mixture of an isoolefin and a diolefin, preferably isobutylene, with isoprene or piperylene or dimethyl butadiene saturated with dissolved carbon dioxide and cooled with pulverized solid carbon dioxide ("dry ice"). A supply of the cold mixed olefinic material is delivered to the wooden reactor, and a small stream of catalyst is applied to the circulating mixture. The resulting polymer is strained out and collected by a workman equipped with a strainer ladle, the excess reactant material being drained off and the solid polymer thrown immediately into a rapid circulating stream of warm water in which the catalyst is destroyed, the small excess of reactants volatilized out and the material washed, ready for drying, milling and further processing.

Thus, the device of the invention provides a polymerization reactor suitable for operation by unskilled mechanics with a minimum waste of valuable raw materials and a minimum cost of installation; the process utilizes a simple olefinic polymerization procedure with a dissolved Friedel-Crafts catalyst to produce the polymerization, while the gaseous refrigerant volatilized by the heat of reaction of the polymerization puffs up the solid polymer into a body which floats upon the surface of the cold reaction mixture. The polymer can be removed from the reaction mixture by a simple strainer to permit recirculation of unreacted olefinic material through a body of solid carbon dioxide for recooling and return, together with additional olefinic material, to the polymerization zone for further polymerization. Other objects and details of the process and products of the invention will be apparent from the following description when read in connection with the accompanying drawings in which Fig. 1 is a side view of a wooden polymerization reactor according to the invention;

Fig. 2 represents a longitudinal vertical section of the same reactor;

Fig. 3 is a top view of the reactor;

Fig. 4 is a transverse vertical section of the reactor;

Fig. 5 is a top view of a set of reactors together with the circulating water stream for quenching;

Fig. 6 is an end elevation of the polymerization equipment;

Fig. 7 is a side view of the embodiment partaking of the character of a flow sheet and Fig. 8 is a side view in vertical section of an alternative embodiment of the polymerizer.

Referring to the drawing, the polymerizer itself consists of a wooden tank member 1 within which there is positioned a partition member 2 near one end of the tank, extending across the width of the tank but with an open space below the lower edge of the partition. Near the middle of the tank there is provided a barrier member 3 extending from the bottom of the tank nearly to the top. Along one side of the tank a duct member 4 is provided connected to a propeller well 5 formed between the end of the tank and the partition 2 by an auxiliary partition 6. Within the propeller well 5 there is positioned a propeller member 7 mounted upon a shaft 8 driven by a convenient source of power 9, an electric motor being indicated in the drawing.

Over the barrier 3 there is positioned a supply pipe 11 equipped with a series of spray heads as shown and connected to a source of catalyst solution as shown at 53 at the lower right hand portion of Fig. 7.

A supply of cold olefinic material is delivered to the reactor through the supply pipe 12 and a supply of solid carbon dioxide is placed in the reactor between the partition 2 and the barrier 3.

A number of reactors of the type shown in Fig. 1 are placed side by side as shown in Fig. 5 to cooperate with a single water channel 15. The reactors are designated A, B, C, D and E in Fig. 5. This water channel 15 conveniently consists of a wooden trough covered over most of its length, but with openings 16 adjacent to the ends of the several polymerizer reactors 1. The circulation of water in this trough is maintained by a circulating pump member 17 so that a steady, not too rapid flow of water is maintained past the ends of the several polymerizers to a collecting station 18. At this point the trough is open and the water flows through a screen member 19 to an intake to a pipe 21 leading to the circulating pump 17.

The necessary materials for the polymerization procedure are supplied by the devices shown in Fig. 7. Aluminum chloride is delivered by the pipe 31 to a container 32 which has a cooling coil 33 therein supplied with a mixture of isopropyl alcohol and solid carbon dioxide from the cooler 34, the alcohol being circulated by a pump 35. Catalyst solvent is added to container 32 through line 35'. A relief valve 36 is provided for the tank 32 and a supply of compressed nitrogen in a cylinder 37 is provided and connected to the tank 32 by a pipe 38 under the control of a valve as shown. An outlet pipe 39 from the tank 32 leads to a filter 41 containing glass wool. From the filter a pipe member 42 leads to an auxiliary cooler 43 in which additional catalyst solvent delivered through a pipe 44 may be mixed with the catalyst solution prepared in the tank 32. From the cooler 43 the catalyst is delivered to a storage tank 45 which is kept cool by solid carbon dioxide in a tank 46. From the storage tank 45 a pipe 47 leads to a working tank 48, also kept cold by a supply of dry ice contained in a box 49. The catalyst solution is delivered from the tank 48 through a pipe 51 and another auxiliary cooler 52 through a pipe 53 to the pipe 11 over the barrier 3 in the polymerizer 1 in Fig. 1.

The isobutylene for the polymerizable mixture is delivered through a pipe 61 to a tank 62 which likewise is equipped with a relief line 63 and a cooling coil 64 closely similar to the cooling coil 33. The isobutylene is delivered at approximately atmospheric temperature and pressure to the pipe line 61 and is condensed in the tank 62 by the presence of a refrigerant in the coil 64 preparatory to the preparation of the polymerization mixture. Simultaneously, the polyolefin, preferably isoprene, is delivered through a pipe line 71 to a smaller tank member 72 also equipped with a relief line 73 and cooling coil 74. The liquid isobutylene, preferably cooled to approximately $-78°$ C., is delivered through a pipe line 65 to a tank member 82. Simultaneously, the cooled polyolefin is delivered through a pipe line 75 to the tank 82 and the olefins are mixed in the tank 82 by the stirring action of a stirrer 83 mounted on a shaft 85 driven by a convenient source of power 85a. The mixed olefins are delivered through a cooler 86 and a pipe line 87 to each delivery pipe 12 (shown in Figs. 1, 2 and 3) in the respective reactors 1.

In the operation of this embodiment of the invention the supply of isobutylene, preferably of a purity of at least 96%, is delivered from the cracking plant to the pipe line 61, preferably through a precooler (not shown) so that it is delivered to the tank 62 either in liquid form or at a temperature close to its liquefaction temperature. In the tank 62 the isobutylene is cooled to a temperature well down towards $-78°$ C. Simultaneously, the polyolefin, preferably isoprene or piperylene, or dimethyl butadiene or myrcene, is likewise condensed and cooled to a temperature close to $-78°$ C. The proper proportions of the olefins are then delivered to the tank 82, mixed therein and sent through the cooler 86 and the pipe 87 to the polymerization reactor at a temperature of approximately $-78°$ C.

In preparing this mixture it is preferable that it consist of a major proportion of an isoolefin having from 4 to 7 carbon atoms, inclusive, preferably isobutylene and a minor proportion of the polyolefin having from 4 to 12 or 14 carbon atoms per molecule. When isobutylene is used, the mixture preferably consists of from 70 to 99.5 parts of isobutylene with from 30 to 0.5 parts of the diolefin. Simultaneously, the Friedel-Crafts catalyst solution is prepared by delivering the solvent through the line 35' to the tank 32 in which it is cooled to a temperature below its boiling point under atmospheric pressure, preferably cooled to a temperature well down towards $-78°$ C. A supply of the Friedel-Crafts catalyst, preferably aluminum chloride, is introduced into the tank 32 through line 31, the cold solvent which is preferably ethyl or methyl chloride is delivered to the tank 32, and the stirrer 90 is put into operation. The aluminum chloride dissolves reasonably rapidly in the alkyl halide solvent at temperatures slightly below the boiling point at atmospheric pressure of the solvent. When approximate saturation is reached the catalyst is delivered through the filter 41 and the cooler 43, which brings its temperature down close to −78° C. and is stored in the tank 45 from which it is drawn to the catalyst supply pipe 11 and its associated spray heads.

When the supply of cold olefinic mixture is ready, the tank member 1 is charged through the pipe 12 to a level which brings the surface layer of the liquid approximately ½ inch above the top of the barrier 3. Simultaneously, the middle portion of the tank 1 is filled with good-sized pieces of solid carbon dioxide and the circulating propeller 7 is put into operation. When the reactor 1 is filled to the proper level with the mixture of solid carbon dioxide and olefinic reactants and is in rapid circulation across the top of the barrier 3, the catalyst flow is started through the spray heads or fine orifices (0.025" in diameter or less) on the pipe 11 and the stream of dissolved catalyst is applied above or beneath the rapidly flowing, turbulent surface of the reacting mixture above the barrier 3. The polymerization begins promptly and is continued in the free space at the right hand end of the reactor tank 1. A portion of the solid carbon dioxide used to cool the reaction mixture dissolves in the olefinic material, and is present in the reaction mixture at the time of the polymerization. The polymerization reaction is exothermic and the heat liberated is in part used to raise the temperature of the olefinic mixture, and in part to volatilize the dissolved carbon dioxide. The volatilization of carbon dioxide occurs at the site of the polymerization reaction, and accordingly the gasified carbon dioxide is occluded in the solid polymer formed, yielding a solid polymer, permeated with small bubbles of gaseous carbon dioxide. The presence of these gas bubbles causes the polymer to float upon the surface of the reaction mixture, leaving the unpolymerized residue free to return through the suction duct 4 to the circulating well 5 and back through the solid carbon dioxide in the center portion of the tank where it is cooled for a return over the top of the barrier 3.

As the solid polymer is produced it is skimmed off by a workman, drained with pressure if desired, and thrown through the door 16 shown in Fig. 5 into the circulating warm water in the duct 15. The warm water promptly volatilizes out any residual traces of unpolymerized reactants and promptly quenches and destroys the aluminum chloride catalyst. The flow of water in the trough 15 carries the polymer to the collecting well 18 where it is separated from the flowing water by the strainer 19. The wet polymer is collected from the well 18 by another operator and thrown out onto a draining platform where excess water is drained off. It is then taken to the open roll mill shown in Fig. 5 for further processing, either simply drying, or drying and compounding with auxiliary reactant material.

The polymer as so produced is found to have a molecular weight within the range of about 20,000 to about 125,000 as determined by Staudinger presented in "Die Hochmolecularen Organischen Verbindungen" published by Staudinger at Berlin in 1932, the method being particularly well shown on page 56. The polymer likewise shows an iodine number as determined by the Wijs method of from 0.1 to 40 or 50. The polymer as obtained is readily soluble in hydrocarbon solvents but because of its high molecular weight, shows a very powerful thickening action in solution and in the solid form shows the property of cold flow, being in effect an extremely viscous liquid. The polymer is reactive with sulfur and other substances in a curing reaction which destroys the property of cold flow and develops an elastic limit, a high elongation and a good tensile strength. The polymers show tensile strengths when cured ranging from 1,000 lbs. per square inch to 4,500 lbs. per square inch and elongations at break ranging from 500% to 1,200% depending upon the absence, or presence and amount of various compounding agents. The polymer is conveniently cured with sulfur in the presence of a sulfurization aid such as tetra methyl thiuram disulfide and its analogous compounds. The polymer is also reactive with para quinone dioxime in an analogous curing reaction, and reactive with various of the analogous and homologous compounds.

For use the polymer is desirably compounded with carbon black, zinc oxide, stearic acid and the curing agent, a suitable compounding recipe being the following:

|  | Parts |
| --- | --- |
| Copolymer | 100 |
| Carbon black | 50 |
| Zinc oxide | 5 |
| Stearic acid | 3 |
| Tetra methyl thiuram disulfide | 1 |

This recipe is conveniently prepared by milling the fresh polymer on the open roll mill until it is somewhat warmed up and plasticized, then adding the compounding agents in small portions, cutting the sheet of polymer back and forth across the face of the mill until the polymer is well incorporated. The compounded polymer may then be placed in moulds and cured by the application of heat at temperatures ranging from 125° C. to 200° C. for time intervals ranging from 180 minutes to 1 minute, depending upon the temperature and the choice of curing agent.

Alternatively, the embodiment of Fig. 8 may be utilized, this being a simpler construction including a wooden tank member 101, a tray 102 carrying solid carbon dioxide, a circulating propeller 103 on a shaft 104 working in a circulating duct formed of the partition 105 in conjunction with the under side 102, a slanting far end 102a of the tray 102 and the bottom end of the tank 101. In the operation of this embodiment the tray 102 is filled with solid carbon dioxide and the mixed reactants prepared by equipment as shown in Fig. 7 are delivered to the tank 101 through a delivery pipe 112. When the tank is full and the reactant mixture chilled to nearly −78° C. and in rapid circulation, the catalyst is delivered through a pipe 111 with an attached spray head which discharges a spray of catalyst onto the top of the rapidly circulating olefinic mixture. The solid polymer collects at the far end of the tank from the catalyst spray 111 and is conveniently removed by a strainer as in the embodiment of Fig. 1 and is desirably thrown into a circulating stream of water as in Fig. 5. The resulting polymer is closely similar in all respects to the polymer produced by the first described embodiment.

Thus the process of the present invention polymerizes an olefinic mixture in the presence of a volatilizable refrigerant under conditions which cause the solid polymer to occlude substantial portions of the volatilized refrigerant, thereby causing it to float freely upon the surface of the reaction mixture from which it is readily skimmed off by a workman for further processing. In addition, the device of the invention provides a simple tank member for the low temperature polymerization of olefinic mixtures in which substantially the whole of the equipment is produced from wood, in a type of construction particularly advantageous for the production of a floating solid polymer and the removal thereof from the reaction mixture and transfer to other portions of equipment. The wooden construction is particularly advantageous since it avoids the necessity of special low temperature steels, greatly reducing the amount of equipment necessary and avoiding the necessity of elaborate heat insulation members on metal drums and ducts. Likewise, the process taught is readily conducted in the open without the necessity for elaborate covers and elaborate recovery and recycling equipment for avoiding the loss of valuable reactive components. Simultaneously, the material produces a high grade polymer which is a highly satisfactory substitute for natural rubber for such uses as tires, tubes, hose, packing and in fact practically all of the articles ordinarily made from rubber.

The invention claimed is:

1. Process for copolymerizing at a low temperature 70 to 99.5 parts of isobutylene and 30 to 0.5 parts of a conjugated diolefin having 4 to 10 carbon atoms per molecule which comprises effecting the reaction in a liquid bath in the presence of solid carbon dioxide, circulating the isobutylene and diolefin mixture over and through a body of solid carbon dioxide so that the low reaction temperature is maintained by the vaporization of the solid carbon dioxide and the isobutylene and diolefin are saturated with dissolved carbon dioxide, passing said mixture as a shallow stream of one half inch for a portion of its travel, polymerizing the isobutylene-diolefin mixture by introducing into the circulating mixture at the shallow stream portion a solution of a Friedel-Crafts catalyst at a temperature substantially that of the low reaction temperature to form solid polymer with the evolution of heat which puffs up the solid polymer and decreases its specific gravity by the presence of occluded carbon dioxide gas, floating the puffed polymer on the circulating stream over a portion of the circulating path, skimming off the floating solid polymer from the surface of the circulating stream and returning the unreacted isobutylene and diolefin to said shallow stream portion.

2. Process for copolymerizing at a low temperature 70 to 99.5 parts of isobutylene and 30 to 0.5 parts of a conjugated diolefin having 4 to 10 carbon atoms per molecule which comprises effecting the reaction in a liquid bath in the presence of solid carbon dioxide, circulating the isobutylene and diolefin mixture over and through a body of solid carbon dioxide so that the low reaction temperature is maintained by the vaporization of the carbon dioxide and the isobutylene and diolefin are saturated with dissolved carbon dioxide, passing said mixture as a shallow stream of one half inch for a portion of its travel, polymerizing the isobutylene-diolefin mixture by the application to the circulating mixture at the shallow stream portion of a solution of a Friedel-Crafts catalyst at a temperature substantially that of the low reaction temperature to form solid polymer with the evolution of heat which puffs up the solid polymer and reduces its specific gravity by volatilizing the dissolved carbon dioxide and occluding the resulting gas in the solid polymer, floating the puffed polymer on the circulating stream over a portion of the circulating path and skimming off the floating solid polymer.

WILLIAM J. SPARKS.
JOHN D. CALFEE.

REFERENCES CITED

The following references are of record in the file of this patent:

UNITED STATES PATENTS

| Number | Name | Date |
|---|---|---|
| 2,269,421 | Arveson | Jan. 13, 1942 |
| 2,240,618 | Harris | May 6, 1941 |
| 2,276,893 | Thomas | Mar. 17, 1942 |
| 2,291,510 | Thomas | July 28, 1942 |
| 2,395,086 | Gilder et al. | Feb. 19, 1946 |

FOREIGN PATENTS

| Number | Country | Date |
|---|---|---|
| 541,076 | Great Britain | Nov. 12, 1941 |
| 543,420 | Great Britain | Feb. 25, 1942 |